(12) United States Patent
Dinwiddie

(10) Patent No.: US 7,750,977 B2
(45) Date of Patent: Jul. 6, 2010

(54) AUTOMATIC SIGNAL ERROR DISPLAY AND USER GUIDED SIGNAL RECOVERY IN A DIGITAL TELEVISION SIGNAL RECEIVER

(75) Inventor: Aaron Hal Dinwiddie, Cicero, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 829 days.

(21) Appl. No.: 10/512,329

(22) PCT Filed: Apr. 21, 2003

(86) PCT No.: PCT/US03/12172

§ 371 (c)(1), (2), (4) Date: Oct. 22, 2004

(87) PCT Pub. No.: WO03/092307

PCT Pub. Date: Nov. 6, 2003

(65) Prior Publication Data

US 2006/0038923 A1 Feb. 23, 2006

Related U.S. Application Data

(60) Provisional application No. 60/375,107, filed on Apr. 24, 2002.

(51) Int. Cl.
*H04N 5/50* (2006.01)

(52) U.S. Cl. ............... 348/569; 348/725; 348/731; 348/563

(58) Field of Classification Search .......... 348/569, 348/734, 725, 731, 553; 725/38, 56, 61; H04N 5/50
See application file for complete search history.

(56) References Cited

U.S. PATENT DOCUMENTS

| 6,108,484 | A | 8/2000 | Lim et al. |
| 6,313,873 | B1 | 11/2001 | Lee |
| 6,542,203 | B1 * | 4/2003 | Shadwell et al. ............ 348/726 |
| 6,621,528 | B1 * | 9/2003 | Kessler et al. ............... 348/734 |
| 7,019,791 | B2 * | 3/2006 | Yoshizawa et al. .......... 348/738 |
| 2002/0075288 | A1 * | 6/2002 | Matsumura et al. ......... 345/690 |

FOREIGN PATENT DOCUMENTS

| JP | 11127397 A | 5/1999 |
| JP | 11313260 A | 11/1999 |
| WO | WO 01/22602 | 3/2001 |

OTHER PUBLICATIONS

Patent Abstracts of Japan, vol. 2000, No. 07, Sep. 29, 2000 & JP 2000-115654, Sharp Corp.
Patent Abstracts of Japan, vol. 017, No. 549, Oct. 4, 1993 & JP 05-153598, NEC Corp.
Search Report Dated Jul. 8, 2003.

* cited by examiner

*Primary Examiner*—Trang U Tran
(74) *Attorney, Agent, or Firm*—Robert D. Shedd; Joseph J. Opalach; Catherine A. Cooper

(57) ABSTRACT

In a digital television signal receiver, upon a signal disturbance of a digital television signal, system state information, with regard to the nature of the signal disturbance of the particular digital television channel is preferably automatically provided to a user as on-screen display representation or graphic thereof. The digital television signal receiver may further provide intervention options for user-guided recovery of the digital television signal that are preferably automatically provided as on-screen menu options.

21 Claims, 3 Drawing Sheets

AUTOMATIC SIGNAL ERROR DISPLAY AND USER GUIDED SIGNAL RECOVERY IN A
DIGITAL TELEVISION SIGNAL RECEIVER

This application claims the benefit, under 35 U.S.C. §365 of International Application PCT/US03/12172 filed Apr. 21, 2003, which was published in accordance with PCT Article 21(2) on Nov. 6 2003 in English and which claims the benefit of U.S. Provisional Patent Application No. 60/375,107, filed Apr. 24, 2002.

BACKGROUND

1. Field of the Invention

The present invention concerns digital television signal processing and, more particularly, concerns digital television signal status with respect to signal disturbance of a digital television signal in a digital television receiver.

2. Background Information

Digital television signals often experience what is known as the "cliff effect", whereby the digital television signal or channel either comes in perfectly or not at all. There is no "in-between" as is the case with an analog television signal. Currently, when the cliff or another like-producing effect occurs, the television only presents to the user either a blank screen or some sort of "weak signal" indication. In both cases, the user is not provided with sufficient information to ascertain the problem. The television thus does not provide any help in determining the problem. The user, therefore, does not know whether the digital television signal is marginal, intermittent, turned off at the source, or whether it is unviewable due to program information or video stream data being invalid.

Presently, some televisions are equipped with a digital television signal strength indicators that is provided as an on-screen display. These signal strength indicators, however, are provided to either aid in the set-up of a digital television antenna which is accessible via a menu option, or strictly as a menu option to ascertain signal strength. For the case of no or low signal strength as the cause of an unviewable digital television signal, the user has the option to view signal strength, but only after navigating through various menu options, in order to try and determine the nature of the signal disturbance. This is a nuisance and also ineffective for marginal signal disturbances that disrupt the digital television signal only briefly (e.g. planes flying overhead).

It is evident from the above that there is a need for providing information regarding signal disturbance of a digital television signal to a user in a digital television signal receiver.

It is further evident from the above that there is a need for presenting system state information regarding a digital television signal disturbance to a user in a digital television signal receiver.

It is moreover evident from the above that there is a need for providing a means to aid a user in resolving signal disturbance issues of a digital television signal in a digital television signal receiver.

SUMMARY OF THE INVENTION

In a digital television signal receiver, upon a signal disturbance of a digital television signal, system state information with regard to the nature of the signal disturbance of the particular digital television channel is preferably automatically provided to a user as on-screen display representation or graphic thereof. The digital television signal receiver may further provide intervention options for user-guided recovery of the digital television signal that are preferably automatically provided as on-screen menu options.

In one form, there is provided a method of providing system state information regarding signal disturbance of a digital television signal in a digital television signal receiver. The method includes: (a) initiating a channel tune for a digital television signal; (b) attempting to provide the digital television signal for presentation by the television signal receiver; and (c) providing an error condition representation to a display in response to a failure to provide the digital television signal for presentation.

BRIEF DESCRIPTION OF THE DRAWINGS

In the drawings.

Corresponding reference characters indicate corresponding parts throughout the several views.

DESCRIPTION OF THE PREFERRED EMBODIMENT(S)

Figure 1:
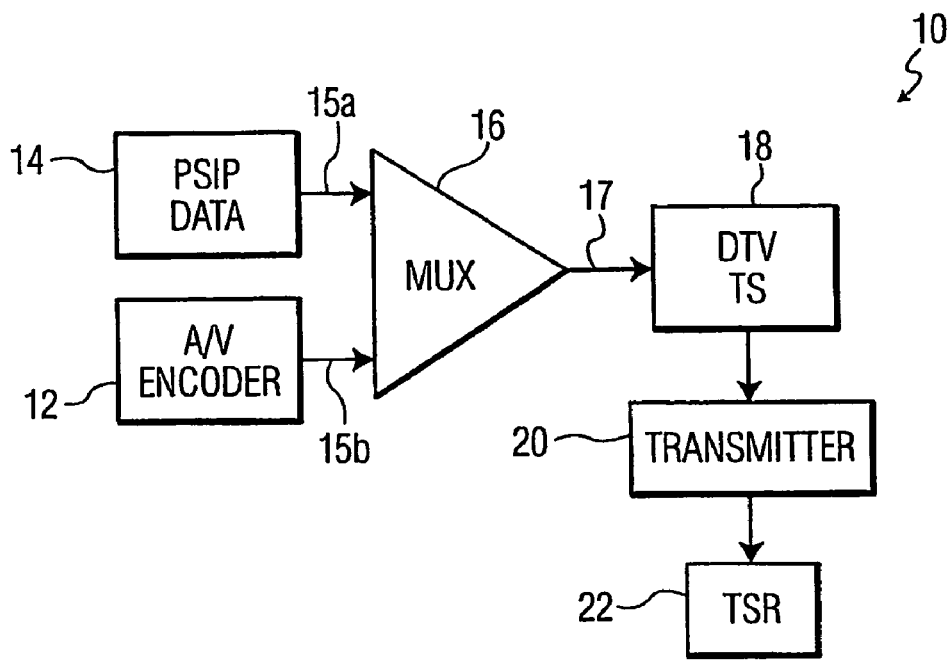
FIG. 1 is a block diagram representation of a digital television system incorporating a television signal receiver in accordance with the principles of the subject invention.

Referring now to FIG. 1, there is depicted a block diagram of a digital television system 10. The digital television system 10 includes an audio/video encoder 12 that is operative, configured and/or adapted to receive audio and video signals and digitally encode the audio and video (A/V) signals in accordance with a particular digital encoding technique or scheme. The digital television system 10 also includes a PSIP data compiler 14. The PSIP data compiler 14 is operative, configured and/or adapted to receive PSIP data, including and encompassing off-air guide data, and digitally encode the PSIP data.

Digital television signals or channels, in accordance with the Advanced Television Systems Committee (e.g. ATSC), contain Program and System Information Protocol (PSIP) information or data. Briefly, PSIP is a small collection of tables designed to operate within every Transport Stream (TS) for broadcast of digital television. Its purpose is to describe the information at the system and event levels for all virtual channels carried in a particular transport stream. Additionally, information for analog channels as well as digital channels from other transport streams may be incorporated.

There are two main categories of information in the ATSC PSIP standard, system information and program data. System information allows navigation and access of the channels within the DTV transport stream. The program data provides necessary information for efficient browsing and event selection. Some tables announce future events and some are used to locate the digital streams that make up an event. The PSIP data are carried via a collection of hierarchically arranged tables. The PSIP information includes what is known as an off-air guide in addition to other information. The off-air guide includes virtual channel number, program title and other information that are used to display various information regarding a given program and channel.

The digital television system 10 further includes a multiplexer (MUX) 16 that is operative to multiplex to input signals into one output signal. In this regard, the multiplexer 16 has two inputs 15a and 15b and a single output 17. One input, arbitrarily 15a, of the multiplexer 16 receives the digitally encoded (digital) PSIP data/signal, while the other input, arbitrarily 15b, of the multiplexer 16 receives the digitally encoded (digital) AN data/signal. The multiplexer 16 provides a multiplexed digital data/signal at its output 17 consisting of the PSIP data/signal and the AN data/signal such as is known in the art.

The output signal of the multiplexer 16 is provided to a digital television (DTV) transport stream (TS) creator/compiler 18 that is adapted, configured and/or operative to assemble the digital PSIP and AN data/signal into a digital transport stream in accordance with ATSC digital television standards. The digital television transport stream creator/compiler 18 is connected to a transmitter 20. The transmitter 20 is adapted, configured and/or operative to transmit the digital television transport stream as a digital television signal. The transmission of the digital television signal is accomplished in a known digital transmission standard, technique or scheme. It should be appreciated that the transmitter 20 is representative of an original transmission as via an over the air transmitter, a satellite transmission or the like, as well as a re-transmission thereof such as via a cable television system and/or any combination of transmission schemes. In any case, the system 10 includes a television signal receiver (TSR) 22 that is adapted, configured and/or operative to receive and utilize the digital television signal. Additionally, the television signal receiver 22 is also operative to receive and utilize analog television signals such as is known in the art. The television signal receiver 22 is adapted, configured and/or operative to function in the manner set forth herein, and particularly in accordance with the present principles. Particularly, and as explained in greater detail below, the television signal receiver 22 is adapted, configured and/or operative to preferably automatically, but not necessarily, provide digital television signal status to a user such as via on on-screen display upon an interruption, disturbance, disruption, discontinuity, or the like (collectively, disturbance) of the digital television signal. The television signal receiver 22 is also adapted, configured and/or operative to further provide, preferably automatically, but not necessarily, user-guided recovery of the digital television signal and/or user-guided intervention to attempt to resolve the disturbance.

Figure 2:
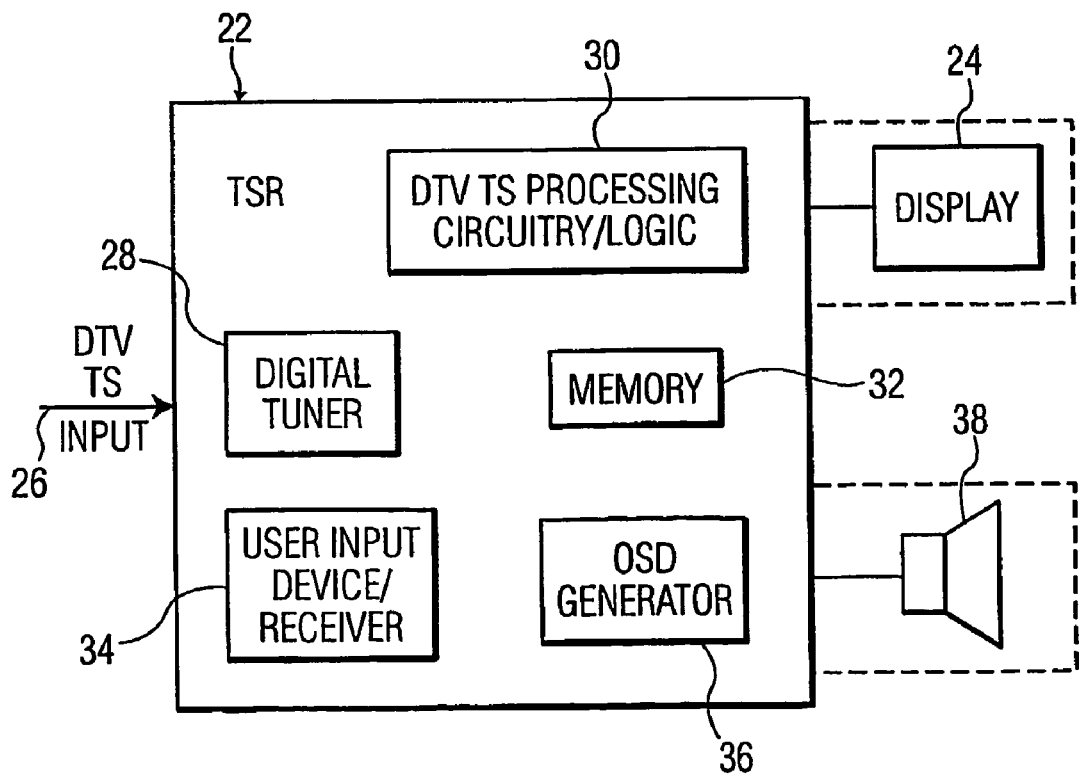
FIG. 2 is a block diagram of an exemplary digital television signal receiver in accordance with the principles of the subject invention.

Referring now to FIG. 2, there is depicted a block diagram of an exemplary television signal receiver 22 in accordance with the principles of the subject invention. The television signal receiver 22 may or may not include an integral display 24 as represented by the dashed lines. In the case that the television signal receiver 22 does not include an integral display, the television signal receiver 22 is connectable to a display 24. In both cases the display 24 is adapted, configured and/or operative to provide, show or depict on-screen display of information and/or data such as various menus with or without user selectable options, graphics, status messages, prompts, lists, and/or the like, some of which are described herein in connection with the principles of the present invention and some of which are known in the art. The television signal receiver 22 may therefore be embodied as a television (having an integral display), a set-top box (connectable to a display), other television signal component, or the like.

The television signal receiver 22 has an input 26 that is adapted, configured and/or operative to be connected to and thus receive digital or digital and analog television signals. It should be appreciated that the term television signals encompasses one or more analog television channels and/or one or more digital television (DTV) transport streams (TS). Since the present invention is particularly concerned with digital television signals, the television signal receiver 22 will be described in conjunction with digital television signals.

The digital television signal is provided on a particular television channel (frequency) and contains one or more digital transport streams. The particular television channel is the physical channel of the digital television signal, while the transport stream defines one or more virtual channels. The physical channel may be the same or different than the virtual channel. A digital tuner 28 is provided that is adapted, configured and/or operative to receive and tune a particular physical digital channel. In keeping with the above, the television signal receiver 22 may also include an analog television signal tuner (not shown) that may be separate from or integrated with the digital tuner.

The television signal receiver 22 further includes digital television (DTV) processing circuitry/logic, processor, processing means, or the like 30. While the digital television processing circuitry/logic is depicted as a single block, it should be appreciated that the digital television processing circuitry/logic 30 may be embodied as one or more integrated circuits (ICs) with or without additional circuitry/logic. The digital television processing circuitry/logic 30 is adapted, configured and/or operative to process the digital television signal/transport stream(s) in order to obtain the audio information for sound reproduction, the video information for display, and obtain the PSIP information including the off-air guide. The digital television processing circuitry/logic 30 is further adapted, configured and/or operative to perform other television signal receiver tasks such as are typical and/or known in the art and to generally control, regulate and/or operate the components of the television signal receiver 22. To this end, the digital television processing circuitry/logic 30 is adapted, configured and/or operative to utilize programming (software) or program instructions that are stored in a memory 32. Again, the television signal receiver 22 may contain analog processing circuitry/logic for processing analog television signals.

Moreover, the television signal receiver 22 includes an on-screen display (OSD) generator 36 that is adapted, configured and/or operative to generate, under control of the processing circuitry/logic 30 and/or program instructions stored in the memory 32, on-screen display signals the allow the display 24 to depict or show various text messages, menus, lists, graphics, representations, and/or the like in accordance with the principles of the subject invention. Such on-screen displays may change in real-time or be static as the case requires in accordance with the subject principles.

Still further, the television signal receiver 22 includes a user input device and/or receiver 34. The user input device/receiver 34 is adapted, configured and/or operable to accept or receive input from a user regarding a selection, choice, toggle button, aspect, feature and/or preference with regard to a feature, function and/or setting of the television signal receiver 22. In one form, the user input device/receiver 34 may be a remote control (not shown) and associated remote control receiver such as an IR transmitter/receiver. In another form, the user input device/receiver 34 may be a panel of buttons or the like that allow user input. User input is accepted and acted on by the television signal receiver 22 for various purposes such as in response to function and/or feature choices provided as on-screen menu choices and/or options.

The television signal receiver 22 additionally includes an audio reproducer 38 such as a speaker or speakers that may or may not be integral with the television signal receiver as represented by the dashed lines. The audio reproducer 38 is operative, configured and/or adapted to reproduce and/or provide audio from the digital television signal or generated by the television signal receiver 22.

It should be appreciated that the television signal receiver 22 also includes other components not particularly shown and/or described herein that are typical of digital television signal receivers. Moreover, the television signal receiver 22 is capable of many features and/or functions typical of current television signal receivers.

The television signal receiver 22 stores program instructions in the memory 32 which are executable particularly by the processing circuitry/logic 30 but which may be executable by other components of the television signal receiver 22. The program instructions or software is stored in the memory 32, which may be any suitable type of memory or storage device. The program instructions provide for the operation of the television signal receiver such as is known in the art in addition to the operation thereof in accordance with the principles of the subject invention. The program instructions provide for the operation of the processing circuitry and/or operation of the various components thereof through the processing circuitry. As such, the execution of the program instructions may be deemed operation/functioning of the television signal receiver 22 in addition to the operation/functioning of the television signal processing circuitry/logic 30.

In particular, the television signal receiver 22 detects disturbance of or in a digital television signal being received at the input 26. This necessarily indicates that the digital television signal or channel has already, initially, or originally been detected and/or added to a list of available digital television channels by the television signal receiver, typically through a channel set-up routine. The disturbance may be a signal interruption, disturbance, disruption, discontinuity, and/or the like (collectively, a signal disturbance or disturbance) of the digital television signal that prevents the presentation of the digital television signal by the television signal receiver 22. Signal disturbance also includes the inability of the television signal receiver 22 to tune to a particular digital television signal (channel), and/or process, buffer and/or decode any portion of the digital television signal (e.g. TS) including PSIP data, either during initial program tune (i.e. a channel change) or whenever a currently decoding channel ceases to decode. Because of the nature of digital signals, the television signal receiver 22 cannot provide a picture and/or sound when there is a signal disturbance. The television signal receiver thus provides a blank screen.

Figure 3:
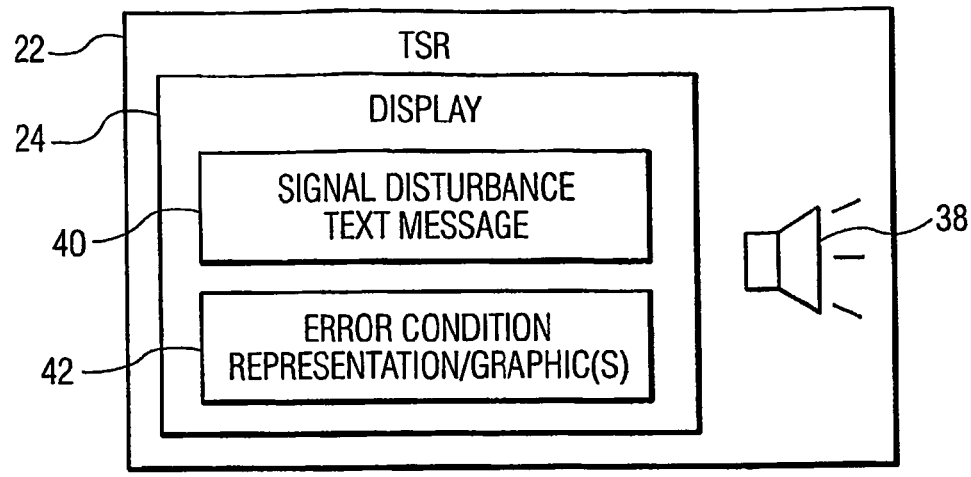
FIG. 3 is a depiction of an on-screen display of an exemplary representation of an error condition with respect to signal disturbance of a digital television signal in accordance with one aspect of the subject invention.

When a channel does not unblank after a predetermined period of time, or whenever the currently decoding channel ceases to decode, the television signal receiver 22 provides system state information to the user. Referring additionally to FIG. 3, in response to the detection of a signal disturbance, the television signal receiver 22 provides system state information to the user in the form of an on-screen presentation or presentations. The system state information is a signal disturbance text message 40 provided by the on-screen generator 36 to the display 24, such as "Weak Signal" or "Searching for Satellite". Of course, other messages may be provided. Additionally, the television signal receiver 22 provides a representation of the particular error condition that caused the signal disturbance. The representation is an error condition representation and/or graphic(s) 42 that is provided by the on-screen generator 36 to the display 24. The signal disturbance text message 40 and/or the error condition representation/graphic(s) 42 are/is provided automatically on the display 24 after the predetermined period of blanking time (i.e. time that the display is blanked), or whenever the currently decoding channel ceases to decode.

The error condition representation/graphics 42 is preferably representative of the signal disruption problem. The error condition representation/graphics 42 may also include (encompasses) audible responses as represented by the speaker 38. As an example of the above principles, in the case of a weak signal as the signal disturbance, the current channel's signal strength may be provided as the error condition representation/graphic(s) 42 on the display 24. This may take the form of signal strength meter providing a scale of signal strength from 0 to 100%, a bar graph, audio tone or other indication. In summation, the error condition representation/graphic(s) 42 provides system state information, preferably automatically, in a user-friendly manner when a signal disturbance occurs. This shows the user what is going on with respect to the particular digital television channel.

Figure 4:
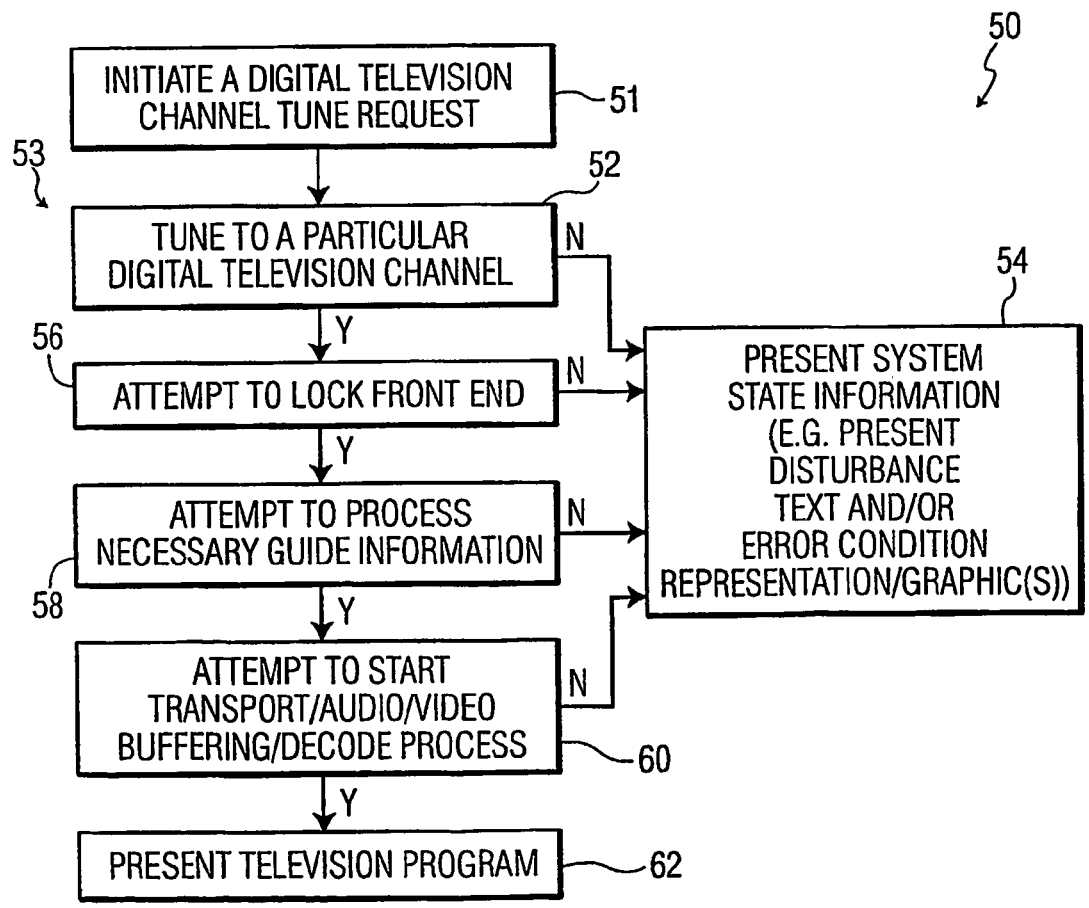
FIG. 4 is a flowchart of an exemplary manner of operation of one aspect of the subject invention.

Referring to FIG. 4, there is depicted a flowchart, generally designated 50, of an exemplary manner of operation of the television signal receiver 22 in accordance with one aspect of the subject invention. Initially, as presented in block 51, a channel tune is initiated. Particularly, the television signal receiver 22 receives a command or request to tune to a digital television channel. While not necessarily so, such channel tune is most likely initiated by a user. It is assumed that the digital television channel is in a viewing or surf list that has been set up by the television signal receiver either by automatic set-up upon initial turn on thereof or through user set-up via a surf list menu, parental control menu, or the like.

In block 52, the television signal receiver 22 thus attempts to tune to the desired television channel. If tuning fails (represented by the designation "N" for no or not tuned), the program flow goes to block 54. It should be appreciated that the attempt to tune to a digital television channel may, and typically does, involve several attempts at tuning at various system levels. Failure to tune is then recognized after a predetermined period of time has elapsed that is sufficient to allow several tuning attempts. Failure to tune thus constitutes a signal disturbance.

In block 54, the television signal receiver 22 presents system state information to the user because of the signal disturbance. Particularly, the television signal receiver 22 through the display 24 or the display 24 and the speaker(s) 38, presents the signal disturbance text 40 indicating the nature of the signal disturbance and the error condition representation/graphic(s) 42 to the user. In this manner, the user knows the nature of the signal disturbance.

If tuning succeeds, (represented by the designation "Y" for yes), the program flows to block 56. In block 56, the television signal receiver 22 then attempts to lock the front end (tuner/link). If locking the front end fails (represented by the designation "N" for no or not locked), the program flow goes to block 54 and the television signal receiver 22 performs in the manner described above for block 54. It should be appreciated that the attempt to lock the front end may, and typically does, involve several attempts at locking at various system levels and/or in various sequential steps. Particularly, this involves many discrete and sequential processes each one of which might succeed or fail. Usually, each of these sequential processes implement retry mechanisms on failures and timeouts to avoid system deadlocks. Failure to lock the front end is then recognized after a predetermined period of time has elapsed that is sufficient to allow several locking attempts or the implementation of such retry mechanisms and/or timeouts. Failure to lock thus constitutes a signal disturbance. In the case of a failure to lock the front end, block 54 may provide information to the user in the manner described above such as lack of channel energy, bit error rate information, or the like that is associated with the failure to lock, that is then thus displayed.

If locking succeeds, (represented by the designation "Y" for yes), the program flows to block 58. In block 58, the television signal receiver 22 then attempts to process necessary guide information/data. If processing the guide information fails (represented by the designation "N" for no or not processed), the program flow goes to block 54 and the television signal receiver 22 performs in the manner described above for block 54. It should be appreciated that the attempt to process the guide information may, and typically does, involve several attempts at processing at various system levels and/or in various sequential steps, such as audio/video pids, ratings data, and the like. Particularly, this involves many discrete and sequential processes each one of which might succeed or fail. Usually, each of these sequential processes implement retry mechanisms on failures and timeouts to avoid system deadlocks. Failure to process the guide data is then recognized after a predetermined period of time has elapsed that is sufficient to allow several processing attempts. Failure to process the guide information thus constitutes a signal disturbance. In the case of a failure to process the guide information, block 54 may provide information to the user in the manner described above. Numerous integrity checks, data CRCs values and range checking of data (i.e. time in the past, illegal values, etc.) which is not successful could be passed up to the user interface and interpreted for display to the user as per block 54 for the failure to process the guide information.

If guide information processing succeeds, (represented by the designation "Y" for yes), the program flows to block 60. In block 60, the television signal receiver 22 then attempts to start transport/audio/video buffering/decoding (buffering/coding for short). If buffering/decoding fails (represented by the designation "N" for no or not processed), the program flow goes to block 54 and the television signal receiver 22 performs in the manner described above for block 54. It should be appreciated that the attempt to buffer/decode may, and typically does, involve several attempts at processing at various system levels and/or in various sequential steps. Particularly, this involves many discrete and sequential processes each one of which might succeed or fail such as over/underflow buffer conditions, invalid decoding, etc. Usually, each of these sequential processes implement retry mechanisms on failures and timeouts to avoid system deadlocks. Failure to buffer/decode is then recognized after a predetermined period of time has elapsed that is sufficient to allow several processing attempts. Failure to buffer/decode thus constitutes a signal disturbance. In the case of a failure to buffer/decode, block 54 may provide information to the user in the manner described above. Numerous integrity checks, data CRCs values and range checking of data (i.e. time in the past, illegal values, etc.) which is not successful could be passed up to the user interface and interpreted for display to the user as per block 54 for the failure to buffer/decode.

The attempting to tune, lock, process and/or buffer/decode the digital television signal as per the blocks 52, 56, 58 and 60, may collectively be considered as attempting to provide or process the digital television signal after the initiation of a tuning request for a digital television signal 51 and represented by the general designation 53. As well, it may collectively be considered as detecting a signal disturbance with regard to the digital television signal. The television signal receiver 22 thus attempts to tune to the requested digital television signal (channel), and provide the tuned digital television signal for presentation by the television signal receiver to the user (allows the user to see or see and hear the digital television signal, program or channel).

If buffering/decoding succeeds, (represented by the designation "Y" for yes), the program flows to block 62. In block 62, the television signal receiver 22 then presents the television program (the audio and video for the selected channel) to the viewer through the display or the display and/or speakers. This process preferably repeats upon each digital channel tuning request.

It should be appreciated that a method in accordance with one aspect of the principles of the subject invention may contain more or less steps than described in conjunction with the flowchart 50 of FIG. 4 and/or different or modified steps than that described. As well, other manners of providing system state information in a user-friendly manner are contemplated and expected.

Figure 5:
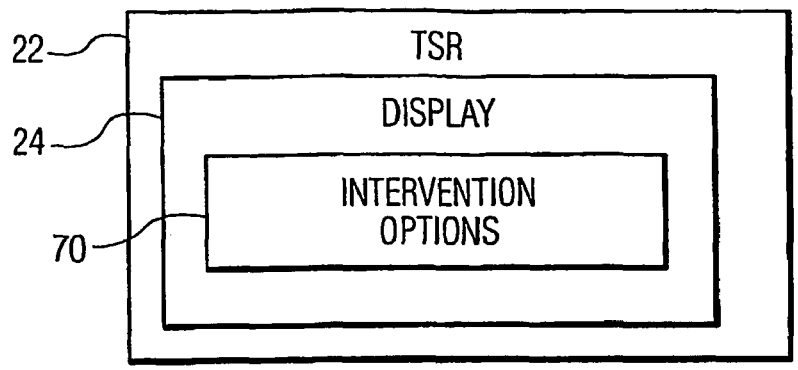
FIG. 5 is a depiction of an on-screen display of an exemplary manner of providing user selectable automatic intervention options for the resolution of the signal disturbance.

In accordance with another aspect of the subject invention, and referring now to FIG. 5, the television signal receiver 22 is also adapted, configured and/or operative to further provide, preferably automatically, but not necessarily, user-guided recovery of the digital television signal and/or user-guided intervention to attempt to resolve the disturbance problem. Particularly, after a predetermined period of time after the screen display of FIG. 3 in which case such is automatically provided to the user, or after the user selects a user intervention choice, the television signal receiver 22 provides intervention options 70 as an on-screen display. More particularly, this entails automatically prompting the user to take steps to try and resolve the issue at hand. The intervention options menu 70 allows the user the ability to try and resolve the particular signal disturbance. As such, the intervention options menu 70 provides user selectable menu options or choices tailored to the specific signal disturbance problem, typically as ascertained and/or provided as the representation/graphic described above.

One example of the various types of intervention options that may be provided is an option to remove the particular digital television channel from the scan list. This may be provided after no signal has been detected for a predetermined period of time. Another example is the option to tweak the antenna and/or allow the user to check other channels. This option may provide for the entering of an antenna information screen/menu after a period of time that a weak and/or intermittent signal is detected. A further example is the option to disable the guide (i.e. off-air guide) should the PSIP (program guide) information be detected as invalid. The user would be taken to the guide menu in order to disable the guide.

As another example, if a subset of non-essential PSIP tables is invalid (e.g. rating table, system time table), the user could be automatically prompted to defeat use of those tables but continue providing the television program. In this case, the user would also be prompted to perform a session unlock of the television signal receiver, typically under a password or PIN, since this operation would override potential rating blocks in effect. Of course, other options tailored to the specific signal disturbance can and are contemplated to be provided.

Figure 6:
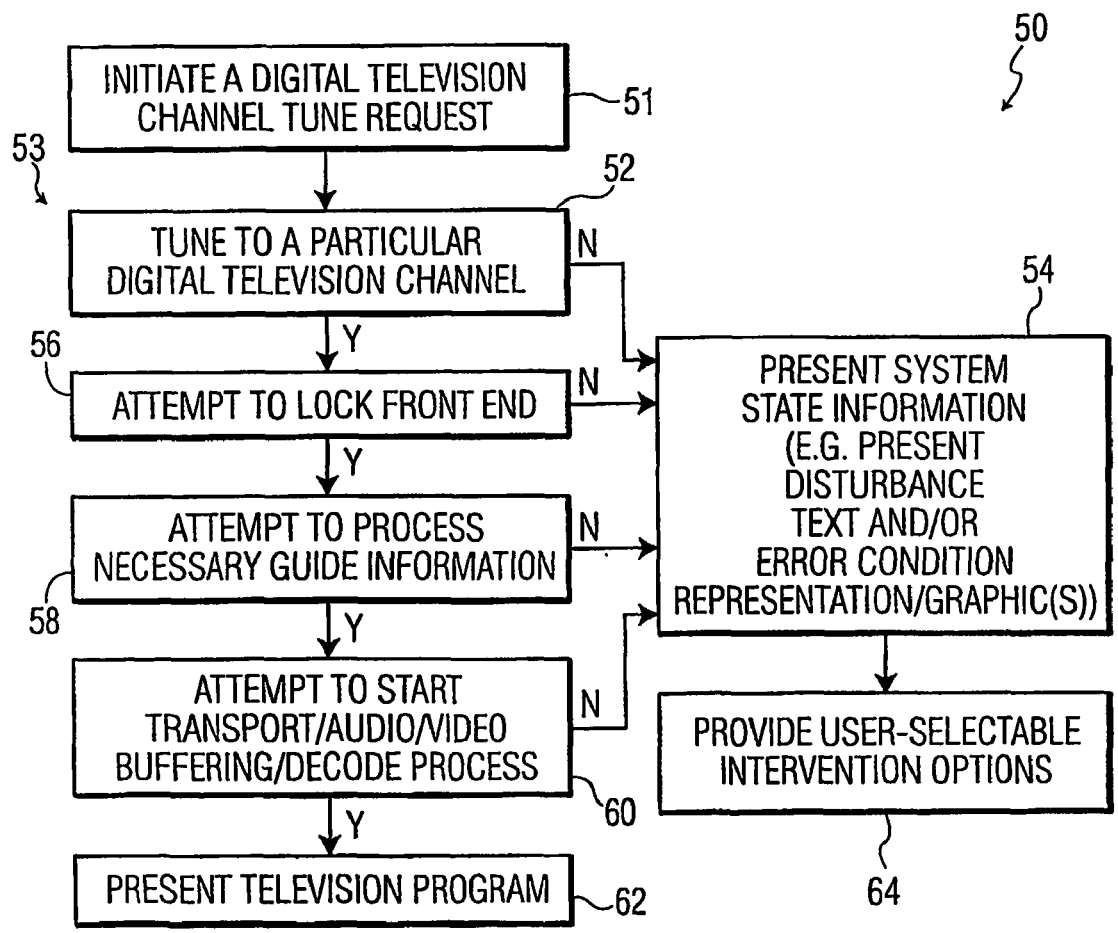
FIG. 6 is a flowchart of an exemplary manner of operation of another aspect of the subject invention.

Referring now to FIG. 6, there is depicted a continuation of the flowchart, generally designated 50 of FIG. 4, providing for the second aspect of the subject invention described above. It should be appreciated that the program instructions for the flowchart 50 of FIG. 4 are applicable to the flowchart 50 of FIG. 7. After block 54 has been presented to the user, the television signal receiver 22 continues on to block 64. In block 64, the television signal receiver preferably, but not necessarily, automatically provides user-selectable intervention options to the display 24 as an on-screen menu. The user may then select an appropriate option or may be provided with the only options available that are dependent upon the particular signal disturbance. Thereafter, once an option is selected and tried, the program flow may start over to attempt to provide the selected digital television channel. Additionally, the user may be provided with the option to choose another digital television channel and thus not deal with the problem.

It should be appreciated that a method in accordance with another aspect of the principles of the subject invention may contain more or less steps than described in conjunction with the flowchart 50 of FIG. 7 and/or different or modified steps than that described. As well, other manners of providing system state information in a user-friendly manner are contemplated and expected.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. In a digital television signal receiver, a method of providing system state information regarding signal disturbance of a digital television signal comprising:
   initiating a channel tune for the digital television signal;
   attempting to provide the digital television signal for presentation by the digital television signal receiver;
   determining if a disturbance in the digital television signal, for presentation to the digital television signal receiver, has occurred; and
   after determining the signal disturbance causing a failure to provide the digital television signal has occurred for a predetermined period of time:
      determining a nature of the signal disturbance including characteristics related to the signal disturbance;
      providing an error condition representation of the system state information regarding the nature of the signal disturbance and characteristics related to the signal disturbance to a display; and
   providing user-selectable intervention options, based upon the nature of the signal disturbance and the characteristics related to the signal disturbance, to the display that are operative to guide a user in recovery of the digital television signal.

2. The method of claim 1, wherein initiating the channel tune for the digital television signal includes receiving a user request for a particular television channel.

3. The method of claim 1, wherein attempting to provide the digital television signal for presentation by the digital television signal receiver includes attempting to lock a front end of the digital television signal.

4. The method of claim 1, wherein attempting to provide the digital television signal for presentation by the digital television signal receiver includes attempting to process guide information of the digital television signal.

5. The method of claim 1, wherein attempting to provide the digital television signal for presentation by the digital television signal receiver includes attempting to buffer at least one of a transport, audio and video of the digital television signal.

6. The method of claim 1, wherein attempting to provide the digital television signal for presentation by the digital television signal receiver includes attempting to decode at least one of a transport, audio and video of the digital television signal.

7. The method of claim 1, wherein providing an error condition representation regarding the signal disturbance to the display upon determining the signal disturbance has occurred includes providing a graphical representation of the error condition.

8. In a digital television signal receiver, a method of providing system state information regarding a digital television signal comprising:
   initiating a channel tune for the digital television signal;
   detecting signal disturbance with respect to the digital television signal; and
   after detection of signal disturbance with respect to the digital television signal, the signal disturbance causing a failure to provide the digital television signal occurring for a predetermined period of time, determining a nature of the signal disturbance including characteristics related to the signal disturbance; providing an on-screen display of system state information regarding the nature of the signal disturbance and characteristics related to the signal disturbance; and providing user-selectable intervention options, based upon the nature of the signal disturbance and the characteristics related to the signal disturbance, to the on-screen display that are operative to guide a user in resolution of the signal disturbance of the digital television signal.

9. The method of claim 8, wherein initiating the channel tune for the digital television signal includes receiving a user request for a particular television channel.

10. The method of claim 8, wherein detecting the signal disturbance with respect to the digital television signal includes attempting to lock a front end of the digital television signal.

11. The method of claim 8, wherein detecting the signal disturbance with respect to the digital television signal includes attempting to process guide information of the digital television signal.

12. The method of claim 8, wherein detecting the signal disturbance with respect to the digital television signal includes attempting to buffer at least one of a transport, audio and video of the digital television signal.

13. The method of claim 8, wherein detecting the signal disturbance with respect to the digital television signal includes attempting to decode at least one of a transport, audio and video of the digital television signal.

14. The method of claim 8, wherein providing the on-screen display representative of the signal disturbance includes providing a graphical representation of the signal disturbance.

15. A digital television signal receiver comprising:
   processing circuitry operative to process a digital television signal;
   a digital tuner coupled to said processing circuitry;
   an on-screen display generator connected to said processing circuitry; and
   memory coupled to said processing circuitry and containing program instructions which when executed by said processing circuitry, causes the digital television signal receiver to:
      initiate a channel tune for the digital television signal;

detect a signal disturbance with respect to the digital television signal; and after detection of the signal disturbance causing a failure to provide the digital television signal occurring for a predetermined period of time, determining a nature of the signal disturbance including characteristics related to the signal disturbance; providing an on-screen display of system state information regarding the nature of the signal disturbance and characteristics related to the signal disturbance; and providing user-selectable intervention options, based upon the nature of the signal disturbance and the characteristics related to the signal disturbance, to the on-screen display that are operative to guide a user in resolution of the signal disturbance of the digital television signal.

16. The digital television signal receiver of claim 15, wherein said memory has further program instructions which, when executed by said processing circuitry causes the digital television signal receiver to tune the channel for the digital television signal that includes receiving a user request for a particular television channel.

17. The digital television signal receiver of claim 15, wherein said memory has further program instructions which, when executed by said processing circuitry causes the digital television signal receiver to detect the signal disturbance with respect to the digital television signal that includes attempting to lock a front end of the digital television signal.

18. The digital television signal receiver of claim 15, wherein said memory has further program instructions which, when executed by said processing circuitry causes the digital television signal receiver to detect the signal disturbance with respect to the digital television signal that includes attempting to process guide information of the digital television signal.

19. The digital television signal receiver of claim 15, wherein said memory has further program instructions which, when executed by said processing circuitry causes the digital television signal receiver to detect the signal disturbance with respect to the digital television signal that includes attempting to buffer at least one of a transport, audio and video of the digital television signal.

20. The digital television signal receiver of claim 15, wherein said memory has further program instructions which, when executed by said processing circuitry causes the digital television signal receiver to detect the signal disturbance with respect to the digital television signal that includes attempting to decode at least one of a transport, audio and video of the digital television signal.

21. The digital television signal receiver of claim 15, wherein said memory has further program instructions which, when executed by said processing circuitry causes the digital television signal receiver to provide the on-screen display representative of the signal disturbance that includes providing a graphical representation of the signal disturbance.

* * * * *